(No Model.)
J. W. CASSIDY.
ROTARY FAN FOR FRUIT DRIERS.
No. 399,973. Patented Mar. 19, 1889.
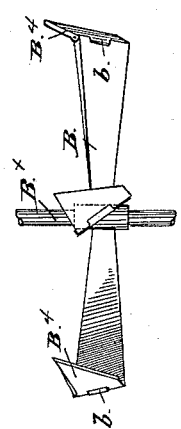
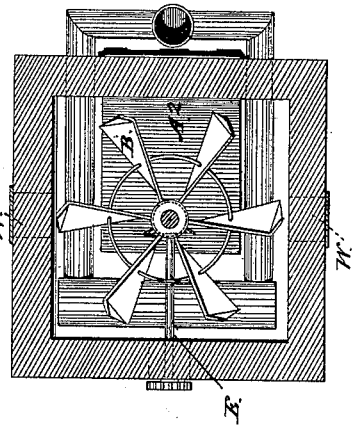
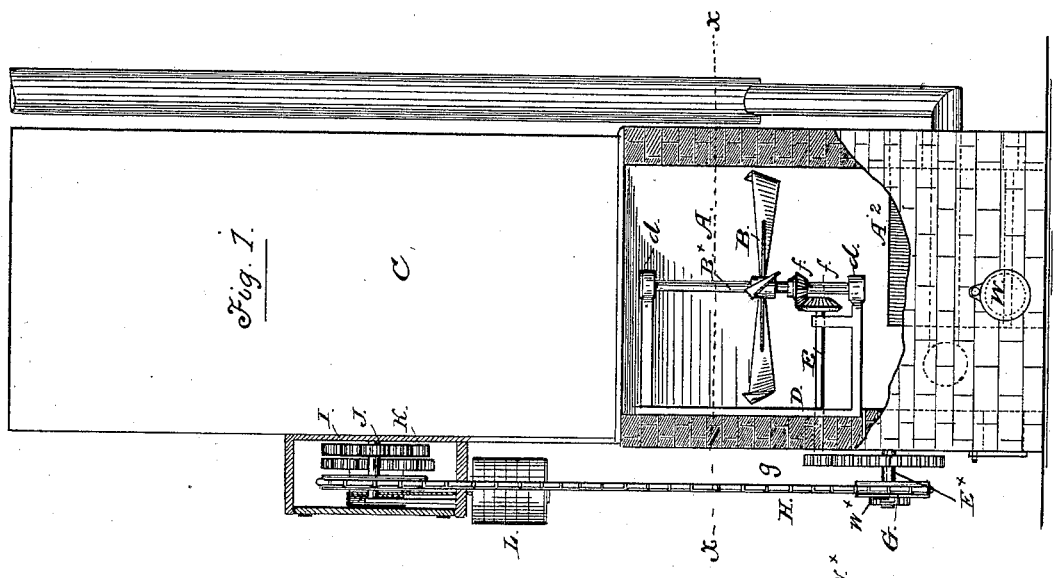
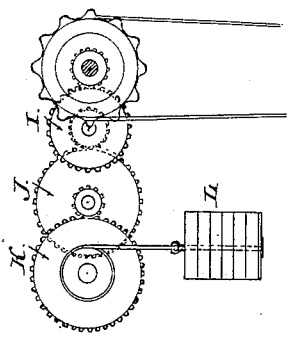
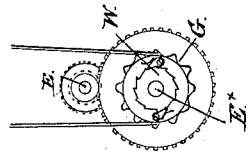
Witnesses:
Inventor:
John W. Cassidy
By Smith & Osborn
his Attorneys.

UNITED STATES PATENT OFFICE.

JOHN W. CASSIDY, OF PETALUMA, CALIFORNIA.

ROTARY FAN FOR FRUIT-DRIERS.

SPECIFICATION forming part of Letters Patent No. 399,973, dated March 19, 1889.

Application filed December 17, 1887. Serial No. 258,240. (No model.)

*To all whom it may concern:*

Be it known that I, JOHN W. CASSIDY, a citizen of the United States, residing in Petaluma, in the county of Sonoma and State of California, have invented certain new and useful Improvements in Rotary Fans for Fruit-Driers; and I do hereby declare that the following is a full, clear, and exact description of my said invention, reference being had to the accompanying drawings, that form a part of this specification.

My invention relates to fruit-driers of the kind that consist of a drying-chamber provided with racks or trays to hold the fruit, and a hot-air generator or furnace, over which the drying-chamber is placed, so that the heated air ascends and passes through the chamber from bottom to top.

My improvements consist in the construction and combination of a hot-air mixing or equalizing chamber or compartment and a rotary fan of novel construction for the purpose; also, in certain construction of fan having adjustable wings, as hereinafter fully set forth.

My present invention refers to improvements in rotary fans to be used with fruit-driers of that kind which have a drying-chamber provided with racks or trays to hold the fruit and a hot-air generator or furnace, over which the drying-chamber is placed, so that the heated air ascends and passes through the chamber from bottom to top; and the invention consists in the construction, combination, and arrangement of the parts of the fan, substantially as will be hereinafter described and claimed.

Figure 1 represents in elevation a fruit-drier having my improved rotary fan applied to it. The brick-work of the hot-air chamber is partly broken away. Fig. 2 is a horizontal cross-section taken at about the line *x x*, Fig. 1, through the hot-air chamber above the fan. Fig. 3 shows the clock-work mechanism which I employ for running the fan. Fig. 4 is a view on a larger scale showing the manner in which I attach the wings to make them adjustable.

The object sought to be attained by this invention is to prevent the formation of columns or currents of air of different temperatures or qualities in the drying-chamber, and to secure and maintain an equal and uniform temperature throughout the whole column or body of air, whereby all parts of the fruit-holding trays will be equally acted on and the fruit will be brought to the same condition of dryness on one portion of the trays as on other portions.

In fruit-driers of the kind described I have found that the ascending heated air in its passage through the drying-chamber frequently tends to form and separate into columns or currents of different temperatures and to maintain this condition during work, in consequence of which some portions of the trays, where the cooler currents of air strike and pass through, will produce imperfectly-dried fruit, while other portions receiving air-currents of higher temperatures will produce overdried fruit. I aim to remedy these defects and secure the desired ends and objects by means of my improved rotary fan. Within the space or chamber A of the fruit-drier I place my improved rotary fan B, which, by means of suitable mechanism, I drive at a slow rate of speed or at such degree of movement that it shall act upon the air passing upward through the chamber A to break up and prevent separate columns or strata of air and produce by its motion an equal quality of temperature. It should be noticed that the fan as thus arranged and operated is not intended to force the air or increase the circulation thereof through the drying-chamber, as is already done in some kinds of driers, so that the power required to run the fan may be of any light character, such as can be obtained from any simple clock-work. A mechanism suitable for this purpose is represented in the drawings, and particularly in Fig. 3. In this construction the fan-spindle B$^\times$ is mounted in bearings *d d* in a bracket, D, and by a counter-shaft power is applied to the spindle to turn the fan with a slow regular motion. The driving-shaft E is geared into the fan by miter-gears *f f*, and is carried to the outside through the brick-work. A sprocket-wheel, G, is fixed on its outer end, and a drive-chain, H, is carried from a train of gears, I J K, above down to this sprocket-wheel. The train is run by a weight, L, that when wound up is calculated to keep the fan in motion a number of hours. Provision is made for winding up the weight by connecting the wheel to the shaft E by a pawl and a ratchet-wheel, W, instead of fixing it directly to the shaft. This enables the sprocket-wheel to be turned in the reverse direction and thus wind up the weight by pulling on the drive-chain.

In addition to the usual vanes, this fan is provided with several wings, $B^4$, which are so applied and set that they stand at an angle with the leading faces of the vanes. They are designed to act as deflectors or to throw the air in different directions across the chamber, and by being set at suitable angles to the faces of the vanes and more or less obliquely they are caused to throw the air from the circumference toward the center or from the center outward. I prefer to make these wings adjustable in most cases, so that they can be set to work at different angles or all in the same angular position with respect to the circle of rotation. For this purpose the wings may be attached to the vane by pivots or hinges, which are made suitably stiff or tight to hold the wings in whatever position they are set.

In the construction shown in Figs. 1 and 2 the wings are fixed rigidly to the vanes; but as the conditions of draft and fire and the force of the wind all act upon the air entering and passing through the chamber A and tend to produce currents or separate bodies of air at different points, according to the position of the drier, and particularly where it is set up for operation out of doors, it is necessary in many cases to make the deflecting-wings adjustable, as I have shown.

I claim—

1. The herein-described improved rotary fan for fruit-driers, having wings $B^4$, hinged to the vanes at $b\ b$, substantially as described.

2. The combination, with the fan B, having wings $B^4$, hinged to the vanes at $b\ b$, the spindle $B^\times$, mounted in the bearings $d\ d$, of the bracket D and suitable actuating mechanism for the fan, substantially as described.

3. The herein-described improved rotary fan for fruit-driers, consisting of the fan-shaft and the vanes, which are provided with deflecting-wings that are capable of adjustment to take different angular positions across the circle of rotation of the fan, as set forth.

In testimony that I claim the foregoing I have hereunto set my hand and seal.

JOHN W. CASSIDY. [L. S.]

Witnesses:
CHAS. E. KELLY,
EDWARD E. OSBORN.